Oct. 31, 1933.	F. G. HEUMANN	1,932,934
LUGGAGE CARRIER
Filed March 16, 1929	4 Sheets-Sheet 1
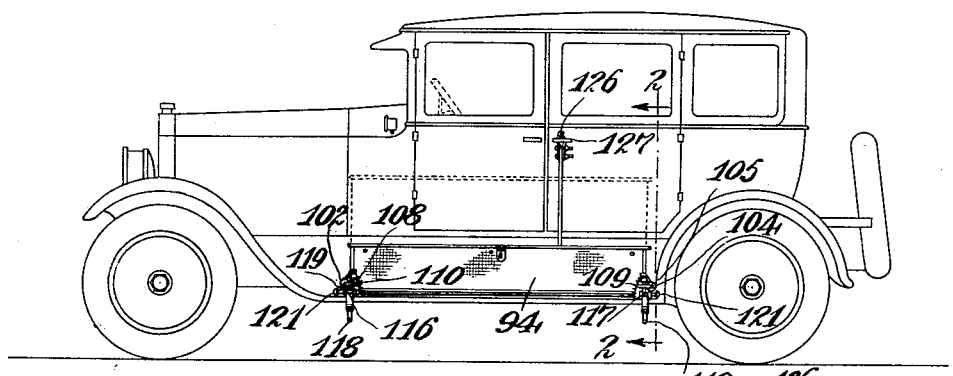
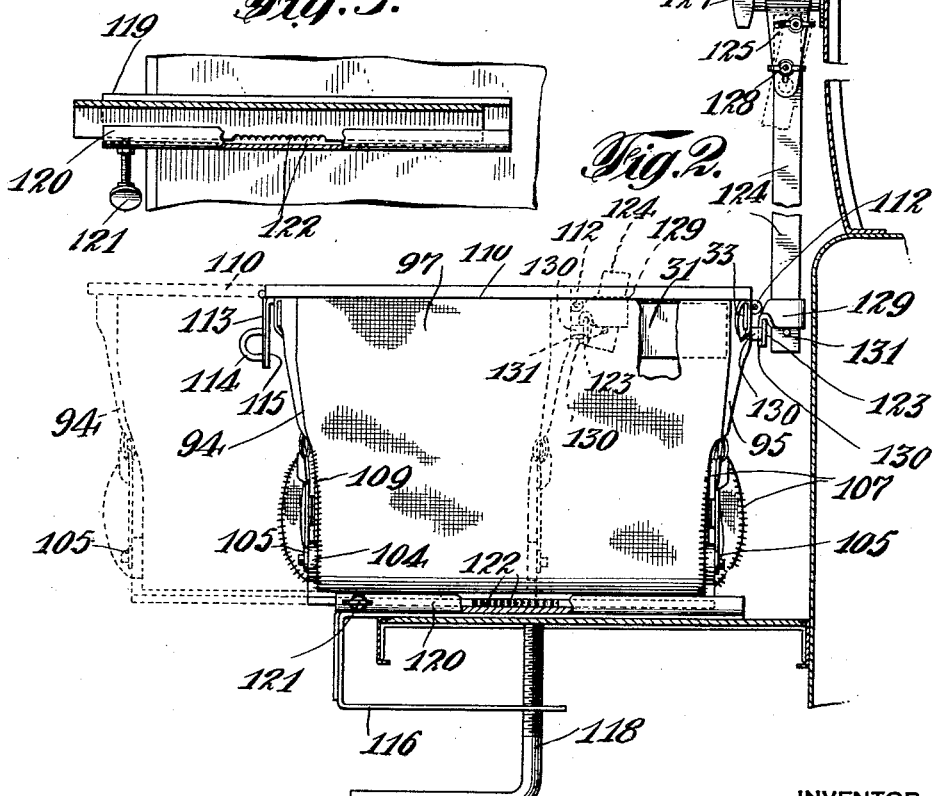
INVENTOR
Ferdinand G. Heumann

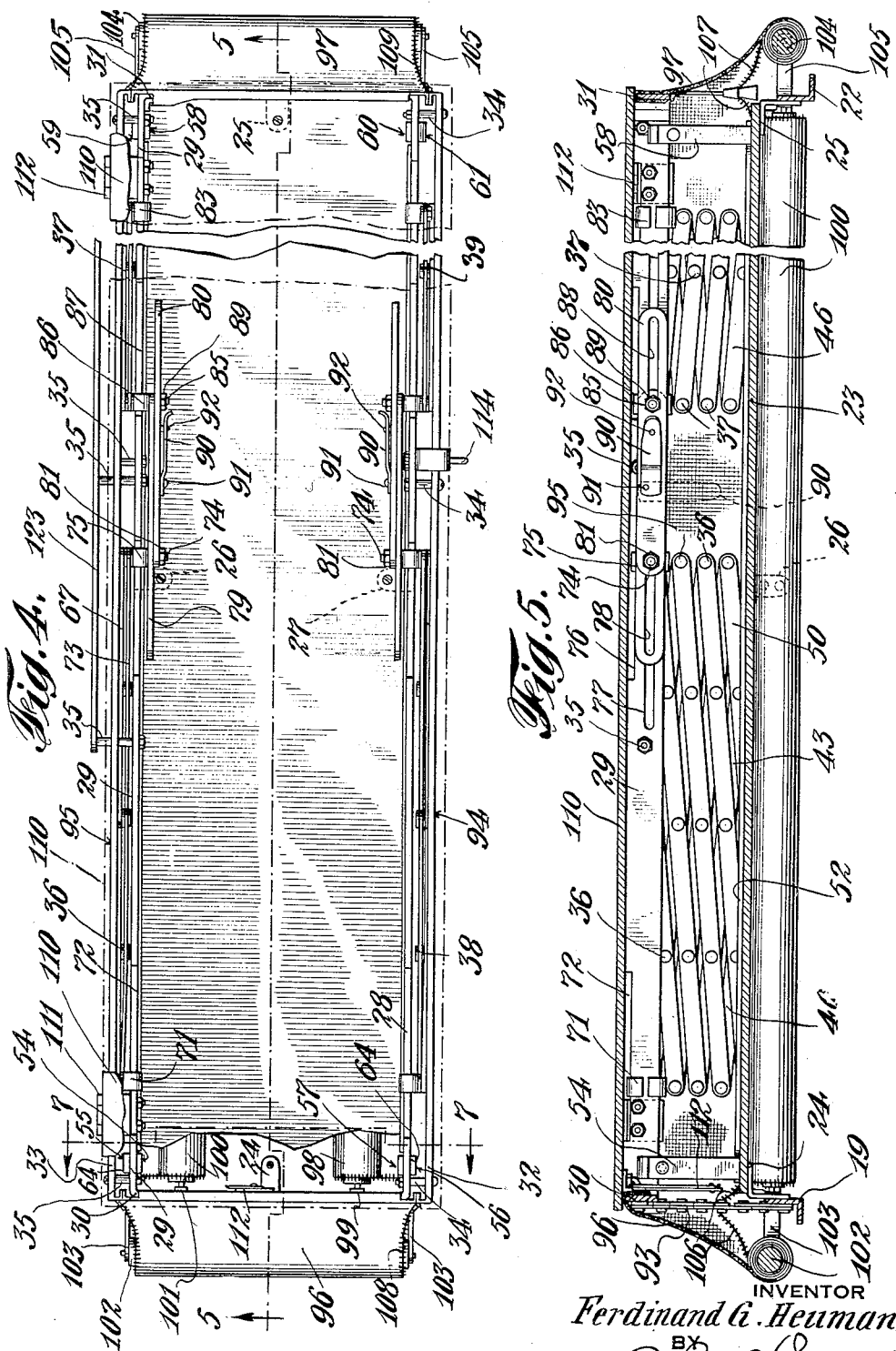

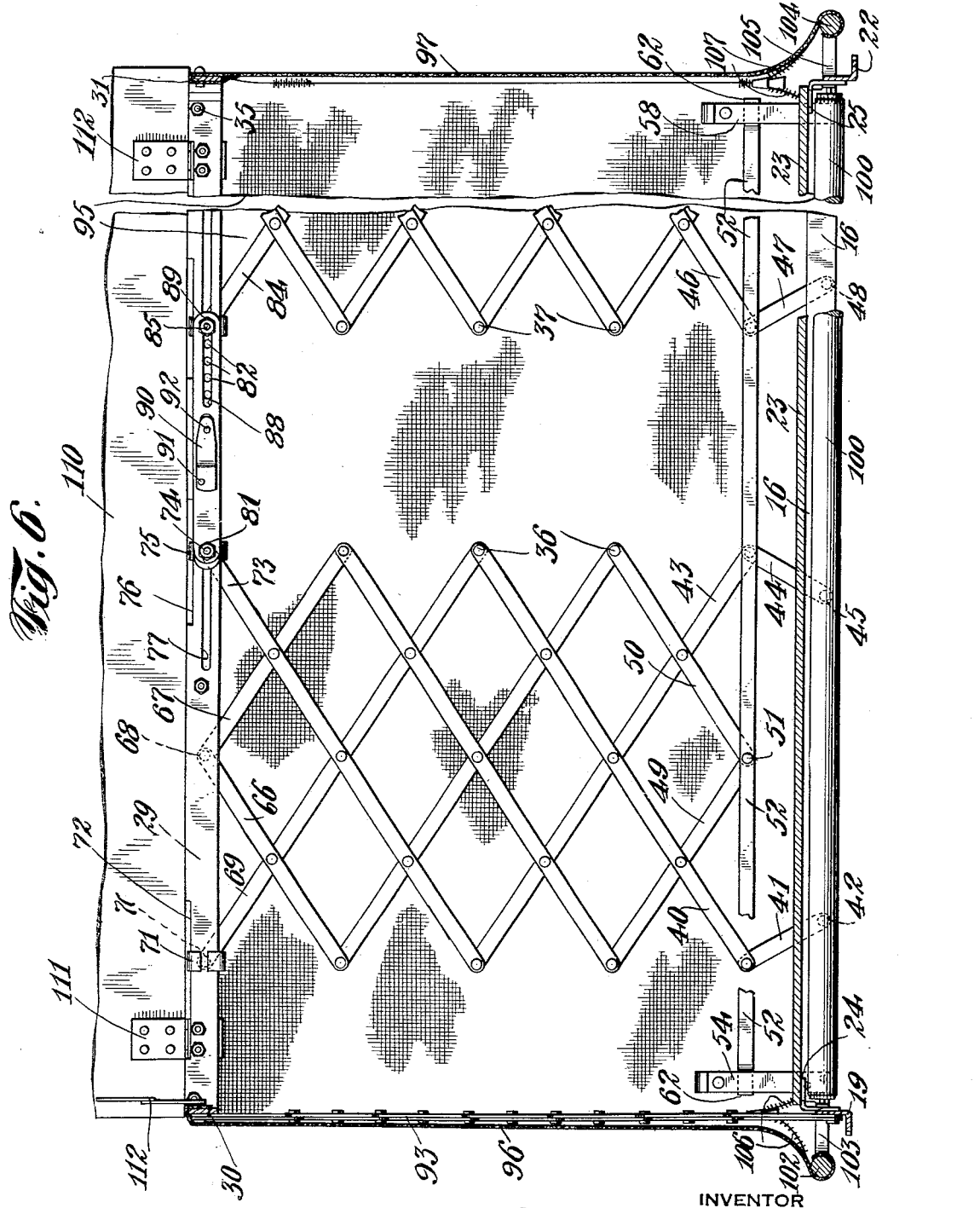

Oct. 31, 1933.  F. G. HEUMANN  1,932,934
LUGGAGE CARRIER
Filed March 16, 1929  4 Sheets-Sheet 4
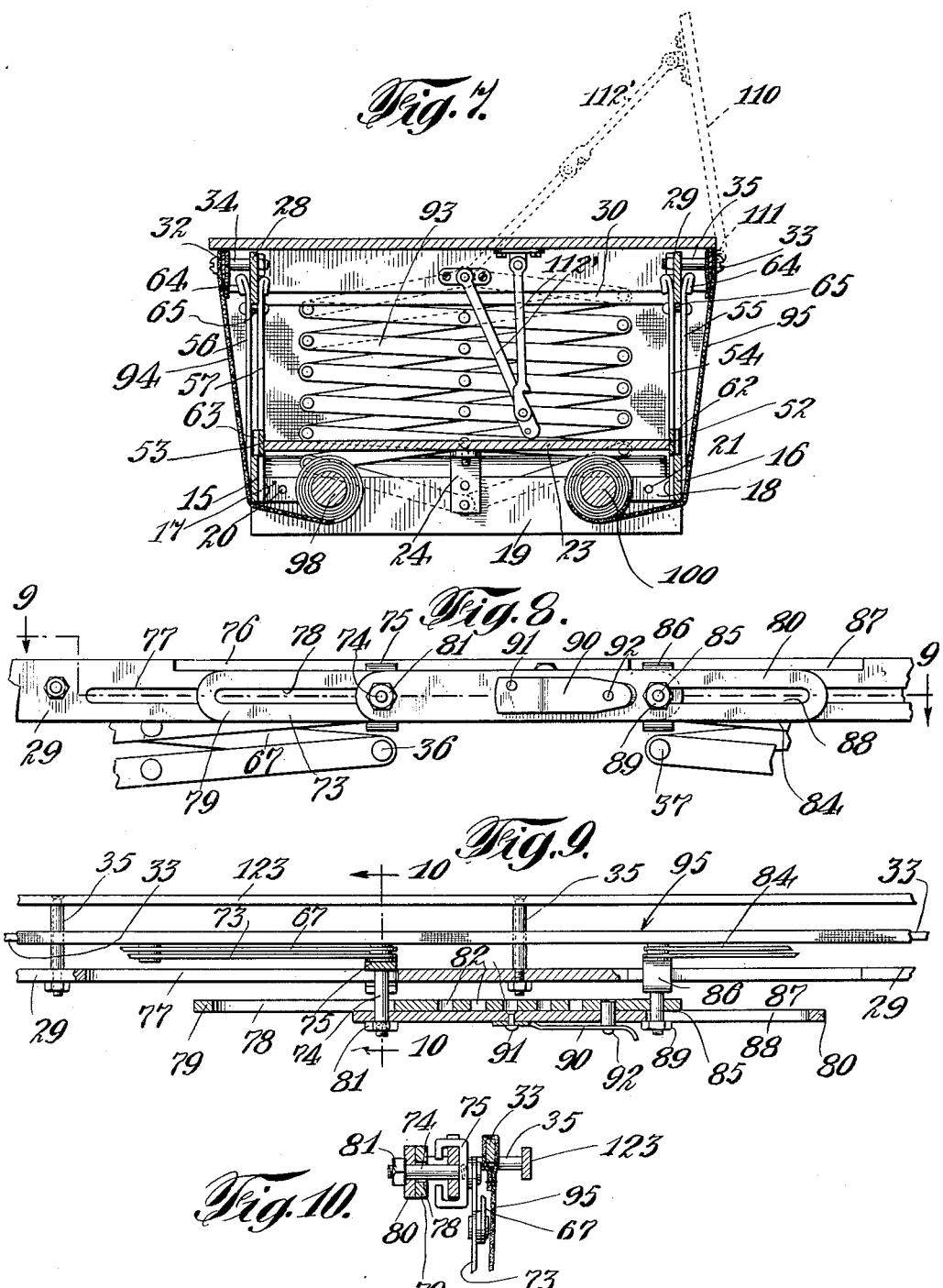
INVENTOR
Ferdinand G. Heumann
BY
Arthur H. Lowell
his ATTORNEY Patented Oct. 31, 1933

1,932,934

UNITED STATES PATENT OFFICE 1,932,934

LUGGAGE CARRIER

Ferdinand G. Heumann, New York, N. Y.

Application March 16, 1929. Serial No. 347,499

8 Claims. (Cl. 224—29)

This invention relates to a luggage carrier of a type which is particularly adapted to be adjustably connected to the running board of a motor vehicle. I am aware that heretofore the running board of an automobile has been used to support and carry luggage. To this end various devices have been employed to maintain the luggage in place. Among such devices, for example, an extensible frame has been used to reach between the front and rear mudguards in such a manner as to maintain suitcases or other luggage in position between the same and the body of the car. In other instances supports have been employed to which, for example, trunks or other articles of luggage may be strapped. All these devices so far as I am aware, are more or less unsatisfactory for obvious reasons, including the feature of leaving the luggage uncovered and holding it in place in a more or less insecure manner.

In carrying out my present invention the luggage carrier made in accordance therewith is so constructed as to be adjustably mounted on the running board of a motor vehicle and to include a structure which is collapsible to occupy a sufficiently small space when not in use to permit the opening and closing of the vehicle doors and when in use to provide a compartment of suitable shape and dimensions to adequately contain and maintain in position a number of dress suitcases or other articles of luggage. My improved luggage carrier preferably comprises a set of frames adjustably connected by extensible devices such as lazy tongs, and a cover which is extensible and contractible with the frame, together with a top which may be locked in a closed position both when the carrier is extended for use and when collapsed, all of which, with the details of construction which I now prefer to employ, will be hereinafter more particularly described.

In the drawings Figure 1 is a side elevation of a motor vehicle illustrating the application and use of my improved luggage carrier, Fig. 2 is an enlarged section on line 2—2, Fig. 1, Fig. 3 is a sectional plan illustrating the devices by which the carrier is automatically adjusted to position and secured therein relatively to the running board of the vehicle, Fig. 4 is a plan with the top of the carrier removed, Fig. 5 is a section on line 5—5, Fig. 4, Fig. 6 is a central longitudinal section with the parts broken away to economize space, Fig. 7 is an enlarged section on line 7—7, Fig. 4, Fig. 8 is a partial elevation illustrating the construction of the devices for maintaining the parts of the carrier in their extended positions, Fig. 9 is a section on line 9—9, Fig. 8, and Fig. 10 is a section on line 10—10, Fig. 9.

By referring to the drawings it will be seen that in carrying out the invention I employ a lower frame member associated with a floor board, an upper frame member connected to the lower frame member by sets of lazy tongs, or equivalent devices, together with a cover and a suitable top, means also being employed to adjustably secure the parts in a raised or extended position, to permit the cover to be raised and lowered with the upper frame, and to adjustably secure the carrier in position on the running board of a vehicle. The lower frame preferably comprises a front longitudinal rail 15 and a back longitudinal rail 16 with the ends thereof turned at right angles thereto as indicated at 17 and 18, together with a forward end member 19 connected to the corresponding ends of the rails 15 and 16 by rivets 20 and 21 or otherwise, and a rear end member 22 which is riveted or otherwise connected to the corresponding ends of the rails 15 and 16. The end members or rails 19 and 22 are preferably angular, that is, at their lower ends they are flanged to be received and secured in suitable tracks provided therefor, as hereinafter described.

Associated with this lower frame there is a floor board or bottom 23. The floor board may be connected to the frame in any suitable manner. As illustrated these parts are connected by brackets 24, 25, 26 and 27. These brackets are preferably angular and the brackets 24 and 25 are connected respectively to the end rails 19 and 22 and also to the ends of the floor board, while the brackets 26 and 27 are suitably connected to the back and front rails 16 and 15 and also to the centrally disposed longitudinal edge portions of the floor board. As will be understood these connections may be made by suitable screws, rivets, or otherwise.

The upper frame member is also preferably rectangular and includes a front rail 28, a back rail 29 and end rails 30 and 31. Associated with the front rail 28 there is an outer rail 32 and similarly associated with the back rail 29 there is an outer back rail 33. The rails 28 and 32 are connected and suitably spaced by spacer bolts 34 and in like manner the rails 29 and 33 are suitably connected and spaced by spacer bolts 35.

The lower and upper frame members are connected by extensible devices. As illustrated these are preferably sets of lazy tongs indicated at 36, 37, 38 and 39. It will be understood that while I have illustrated four sets of these lazy tong devices any suitable number thereof may be employed. The tong bar 40 of the lazy tongs 36 is pivotally connected at one end to the end of a link 41, the opposite end of the link 41 being connected to the back rail 16 by a pivot 42 or otherwise. Similarly the complementary tong bar 43 of the lazy tongs 36 is pivotally connected at one end to an end of a link 44, while the opposite end of the link 44 is pivotally connected to the back lower rail 16, as indicated at 45. In like manner the lower end of the tong bar 46 of the lazy tongs 37 is pivotally connected at one end to an end of a link 47, the opposite end of which is pivotally connected to the back rail 16, as indicated at 48. The lower end of the tong bar complementary to the tong bar 46 is connected to the back rail 16 in a manner similar to that hereinbefore described with the connection between the tong bar 43 and the back rail. Obviously also the lower ends of the corresponding tong bars in the lazy tongs 38 and 39 are connected in a like manner to the front rail 15. These parts being similarly connected it is unnecessary to further describe them in detail.

The lower ends of the tong bars 49 and 50 of the lazy tongs 36 are pivotally connected to each other, as indicated at 51, and also to a stay rod 52. In like manner the lower ends of the tong bars of the lazy tongs 37 corresponding to the tong bars 49 and 50 and the lazy tongs 36 are pivotally connected to each other and to the stay rod 52. The sets of lateral tongs 38 and 39 are similarly connected to a stay rod 53 at the front of the carrier which is similar in all respects to the stay rod 52.

These stay rods 52 and 53 are adapted at their ends to slide between suitable guide bars which are connected to and extend upwardly from the longitudinal front and back rails 15 and 16 of the lower frame member. The guide bars for the forward end of the stay rod 52 are indicated at 54 and 55. The guide bars for the corresponding end of the stay rod 53 are indicated at 56 and 57. The guide bars for the opposite end of the stay rod 52 are indicated at 58 and 59 and the guide bars for the corresponding end of the stay rod 53 are indicated at 60 and 61. The forward end of the stay rod 52 is offset as indicated at 62 and this offset end is the part of the rod which slides between the guide bars 54 and 55. Similarly at the corresponding end of the stay rod 53 the same is offset as indicated at 63 and this offset end of the stay rod is the part thereof which slides between the guide bars 56 and 57. At its opposite end the stay rod 52 is provided with an offset portion which slides between the guide bars 58 and 59 and in like manner this end of the stay bar 53 is adapted to slide between the guide bars 60 and 61. As will be understood these offset portions of the stay rods form shoulders coacting with the adjacent edges of the guide bars to prevent the frames when the lazy tongs are extended from swaying longitudinally of the carrier and thus function as stay bars or stiffeners, as described. Also as will be seen by reference to Fig. 7 the upper ends of the guide bars are caused to diverge and are turned over on themselves, as indicated at 64. Adjacent the upper ends of these guide bars the out turned ends are maintained in a spaced position by a suitable spacer bolt 65.

The upper ends of the tong bars 66 and 67 are pivotally connected, as indicated at 68, as is customary in lazy tongs structures. The corresponding members of the other sets of lazy tongs are similarly connected. The upper end of the tong bar 69 is pivoted, as indicated at 70, to a collar 71 which spans and is slidable on a portion of the back rail 29 of the upper frame. That portion of the rail 29 in which the collar slides is notched, as indicated at 72. The upper end of the tong bar 73 is pivotally connected to a bolt 74. The bolt 74 is suitably connected to a collar 75. This collar 75 is fitted on the rail 29 so as to slide in the notched portion 76 thereof. The bolt 74 passes through and is movable in a slot 77 in the rail 29. The bolt 74 also passes through and is movable in a slot 78 provided therefor in a lock bar 79. This bolt 74 also passes through a bolt hole provided for the same in another lock bar 80 exteriorly of which the bolt 74 is fitted with a nut 81. The portion of the bolt 74 which passes through the collar 75 may be screw threaded so as to fix the relative position of the bolt in the collar, or these parts may be otherwise fixed relatively to each other. In the lock bar 79 there is a series of holes 82 preferably spaced in equally distant positions along the central longitudinal portion of the lock bar.

At the upper end of the lazy tongs 37 there is a collar 83 connected thereto and slidable in a notched portion of the rail 29 in a manner similar to that hereinbefore described in connection with the collar 71. The upper end 84 of the tong bar of this lazy tongs 37 is pivotally connected to a bolt 85. This bolt is secured to a collar 86 in a manner similar to that in which the bolt 74 is connected to the collar 75, as hereinbefore described. This collar 86 is placed on the rail 29 to slide in a notched portion 87 thereof. The bolt 85 passes through a bolt hole provided therefor in the lock bar 79 and also through a slot 88 provided therefor in the lock bar 80 and exteriorly of the lock bar 80 this bolt 85 is fitted with a nut 89 in the customary manner. A spring arm member 90 is pivotally connected, as indicated at 91, to the lock bar 80 and carries a pin 92 adapted to pass through an opening provided therefor in the lock bar 80 and in any one of the holes 82 in the lock bar 79 in order to maintain the lazy tongs and consequently the upper frame of the carrier in any one of a plurality of extended positions, it being understood, of course, that in order to adjust the lazy tongs and the upper frame to any extended position it is necessary to withdraw the lock pin 92 from its position in any of the holes 82 when, as will be understood, the spring and the pin may be turned to the dotted line position as shown in Fig. 5.

At the forward end of the carrier I prefer to employ a lazy tongs structure indicated at 93 and connected at its lower end in the end rail 19 and at its upper end in the end rail 30. The purpose of this lazy tongs is merely that of preventing articles from working out or being taken from this end of the carrier, as will be hereinafter more particularly described.

It will also be understood that no similar structure is necessary at the opposite or rear end of the carrier inasmuch as this end is protected by the rear mudguard. In instances, however, where the carrier is sufficiently short to make it necessary a lazy tongs similar to the lazy tongs 93 may be employed at the rear end of the carrier. Obviously lazy tongs may be employed at both ends in all instances if considered desirable or necessary.

The structure as hereinbefore described is provided with a suitable cover made of canvas, oilcloth, or like flexible fabric, or other material which is preferably waterproof. This cover is so fitted to the carrier as to comprise a series of curtains which are extensible and contractible with the adjustment of the frame. The front curtain is indicated at 94, the back curtain at 95, the forward end curtain at 96 and the rear end curtain at 97. The front curtain 94 is connected at its upper end to the outer rail 32 and depends therefrom with its lower end suitably connected to a roller 98. This roller 98 is preferably a spring actuated roller of the shade curtain type and at its ends is suitably mounted in brackets 99. As indicated in Fig. 7 the curtain in extending from the rail 32 to the roller passes over the lower edge of the lower front rail 15. In a similar manner the back curtain 95 is connected at its upper edge to the back rail 33. This curtain depends from the rail 33 and at its lower end is suitably connected to a roller 100 mounted in brackets 101. The brackets 99 and 101 are suitably connected to the end rails of the lower frame. The forward end curtain 96 is connected at its upper end to the upper end rail 30 and at its lower end to a roller 102 extending between and mounted in brackets 103 suitably secured in the lower end rail 19. In like manner the rear end curtain 97 is connected at its upper end to the end rail 31 and at its lower end to the roller 104 which extends between and is suitably mounted in brackets 105 that are attached to and extend from the lower end rail 22. The edge portions of these curtains which form the cover are preferably fitted with sliding closure devices which may conveniently be of the so called zipper closure type. The closure device between the forward end of the back curtain 95 and the adjacent end of the forward end curtain is indicated at 106, the closure structure between the rear end of the back curtain and the adjacent edge of the rear end curtain 97 is indicated at 107, the closure device between the forward end of the front curtain 94 and the adjacent edge of the forward end curtain is indicated at 108, and similarly the closure device between the rear edge of the front curtain 96 and the adjacent edge of the rear end curtain 97 is indicated at 109. It will be understood that when the frame is raised and the curtains extended the closure structures may be operated to completely close the cover and that in collapsing the carrier the closure structures are opened and in collapsing the parts of the carrier the curtains are thereby automatically wound on the rollers provided therefor, the tension on which obviously maintains the curtains in a tightly drawn position irrespective of the extent to which the parts of the carrier may be moved in adjusting the same to a desired position.

The carrier is also provided with a suitable top indicated at 110. This may be connected to the upper frame by means of suitable hinges indicated at 111 and 112. One leaf of each hinge is preferably connected to the back inner longitudinal rail 29 of the upper frame and the other leaf of each hinge to the top member itself. The top when raised may be maintained in position, as shown in dotted lines in Fig. 7, by a suitable bracket 112' or otherwise, the respective ends of the hinged parts of which are connected to the top and to either or both end rails of the upper frame. Also as illustrated the carrier may be provided with a suitable lock to maintain the top in a closed position. As indicated in Fig. 2 this lock device may include a hinge, one leaf of which is connected to the carrier and the other leaf 113 of which is provided with a slot to receive a loop or bail 114 which is carried by a bracket 115 or connected directly in the front rails of the upper frame member in any convenient manner. It will be understood, of course, that a lock of any ordinary type may be fitted through the loop or bail 114 and locked after the leaf 113 has been placed in position to lock the top in its closed position.

In order to secure the luggage carrier in place on the running board of a motor vehicle I employ a number of cleats. As illustrated there are two of these cleats employed and they are indicated at 116 and 117. Each cleat is preferably U-shaped and fitted with a suitable screw 118 by which it may be clamped in position on the running board. The upper leg of each cleat which lies on the upper surface of the running board is provided with an upstanding flange 119 at one edge thereof and with an overhanging flange 120 at the opposite edge thereof. This upper member of the cleat is, therefore, constructed to receive and act as a guideway for the lower portion of the angular end members 19 and 22. The flanges at the lower ends of these angular end members 19 and 22 are adapted to fit and slide within the upper legs of the cleats. The overhanging flange of each cleat is fitted with a clamp nut 121 and the edge of the flange at the lower portions of each of the angular end members 19 and 22 is notched as indicated at 122. By this structure, as will be understood, the luggage carrier may be adjusted to position relatively to the running board and secured therein by the clamp nut 121.

Associated with the back rails of the upper frame member there is an outer rail 123. This is connected to these rails and spaced from the outer back rail 33 by the spacer bolts 35. This rail 123 is appreciably shorter than the carrier, as indicated in Fig. 4. I also employ a stay rod 124. Connected to one end of the stay rod 124 there is a clamp plate 125. The clamp plate 125 is preferably pivotally connected to the stay rod 124 as indicated at 126 and these parts are adapted to engage the handle 127 of a door of the car and to grip the same by means of the clamp screws 128 or otherwise. On the stay rod 124 there is a collar 129 which is constructed to include a bracket 130. The bracket 130 is adapted to fit over and engage the rail 123. A pin 131 may be provided in the stay rod 124 to prevent the collar 129, which is slidable thereon, from being normally removed therefrom. These parts are employed to prevent the luggage carrier when in use from having sufficient lateral, that is, crosswise movement, due to vibration or otherwise, from striking or coming into contact with the car body. Consequently these stiffener devices are only employed when the luggage carrier is in use and may be readily removed and stored in the carrier, or any other place, when not in use.

In carrying out the invention the luggage carrier as hereinbefore described is preferably constructed to be of any desired length, of a width suitable to be supported on the running board of a vehicle and of a height when collapsed to permit the top to assume a position below the bottom of the car doors in order not to interfere with the operation of the car doors. When in a collapsed position, as will be understood, the lazy tongs or other extensible devices employed, are contracted and the curtains forming the cover are wound on their respective rollers. When in this position the back of the luggage carrier may be closely adjacent the body of the car and secured in place by means of the clamp nuts 121. When the luggage carrier is to be used it may be first shifted laterally relatively to the car and caused to overhang the running board to any desired extent, and then secured in an adjusted position by means of the clamp nuts 121, as indicated in Fig. 2 of the drawings. When thus adjusted the upper frame may be raised to any desired extent within its limits of extension and the lazy tongs structures correspondingly extended and locked in their extended positions by means of the lock bars 79 and 80 and the pins 92. It will be understood that when so raising the upper frame and extending the lazy tongs the curtains forming the cover will be unwound from their respective rollers. When thus unwound the curtains may be connected by shifting the slidable closure members at the edges thereof to the necessary extent to make the cover continuous. In so doing, as will be understood, the stay rods 52 and 53 will be correspondingly raised and the ends thereof shifted between the guide members so as to form stiffening devices for giving the carrier longitudinal rigidity. The stay rod 124 may then be connected to the handle of a door of the car and its collar 129 fitted to the rail 123 to provide a lateral rigidity in the luggage carrier. With the parts thus adjusted the luggage carrier is adapted to receive suit cases or other articles of luggage as it may be desired to place therein. As described no provision is made for locking the closure members for connecting the edges of the curtains. For this reason it will be apparent that the forward end curtain 96 may be disconnected from the edge portions of the front and back curtains and thus access gained to the interior of the carrier even when the top 110 might be locked. In order to obviate any such access to the interior of the carrier the lazy tongs structure 93, or a similar device, is employed at the forward end thereof, as hereinbefore described. Obviously in collapsing the carrier operations the reverse of those described are necessary, that is, in collapsing the carrier the stay rod 124 may be first disconnected, the cover opened, the closure devices at the corners opened in separating the curtains, whereupon the pins 92 may be withdrawn from the holes they are caused to occupy in the lock bars 79 thereby unlocking the lazy tongs, or other extensible devices, and permitting the upper frame to be lowered. Automatically with the lowering of the upper frame the curtains are wound on their respective rollers. With the parts in position, as is clearly indicated in Figs. 4 to 7, the end portions of the inner rails 28 and 29 fit within the upper portions of the guide members for the stay bars 52 and 53. Obviously also the top may be closed and locked both when the parts of the carrier are collapsed and when they are extended.

I claim as my invention:

1. In a luggage carrier, a fixed lower frame, an upper frame, sets of lazy tongs, means for pivotally connecting the ends of each set of lazy tongs to the said lower frame, stay bars to which each set of lazy tongs are pivotally connected, the opposite ends of the stay bars cooperating with fixed guide members for directing the movement of the same and means for locking the upper frame and the sets of lazy tongs in an extended position.

2. In a luggage carrier, a lower frame, an upper frame, sets of lazy tongs, means for connecting the lower end of each set of lazy tongs to the said lower frame, means for connecting the upper end of each set of lazy tongs to the upper frame, a set of lock bars in the upper frame, devices for connecting the said lock bars with the means for connecting the upper ends of adjacent sets of lazy tongs with the said upper frame, and means for securing the said lock bars in any one of a plurality of positions.

3. In a luggage carrier, a lower frame, an upper frame, a plurality of lazy tongs on each side of the carrier pivotally connected at their lower end to the said lower frame, sliding collars carried by the upper frame, lock bars, bolts for pivotally connecting the upper ends of the sets of lazy tongs to the said collars and the lock bars to the said upper frame, and means for maintaining the said lock bars in any one of a plurality of positions.

4. In a luggage carrier, a lower frame, an upper frame, sets of lazy tongs, means for connecting the lower ends of the lazy tongs to the lower frame, collars slidable on the said upper frame, lock bars, a bolt to which the upper end of a set of lazy tongs is pivotally connected, the said bolt passing through and slidable in a slot in the upper frame, through a slot in one of the lock bars and movable with the other lock bar, a second bolt to which the upper end of another set of lazy tongs is pivotally connected, said second bolt passing through and slidable in a slot in the upper frame, movable with the lock bar in which the first said bolt slides and passing through a slot in the lock bar with which the first said bolt is movable, and means for securing the said lock bars in any one of a plurality of positions.

5. In a luggage carrier, a lower frame, an upper frame, sets of lazy tongs, means for connecting the lower ends of the lazy tongs to the lower frame, collars slidable on the said upper frame, lock bars, a bolt to which the upper end of a set of lazy tongs is pivotally connected, the said bolt passing through and slidable in a slot in the upper frame, through a slot in one of the lock bars and movable with the other lock bar, a second bolt to which the upper end of another set of lazy tongs is pivotally connected, said second bolt passing through and slidable in a slot in the upper frame, movable with the lock bar in which the first said bolt slides and passing through a slot in the lock bar with which the first said bolt is movable, and a lock bolt adapted to pass through one of the said lock bars and to engage any one of a number of holes in the other lock bar for maintaining the said lock bars in any one of a plurality of positions.

6. In a luggage carrier, a lower frame, an upper frame, extensible devices connecting the upper frame with the lower frame making the upper frame movable relatively to the lower frame, curtains connected at one end to the upper frame, rollers to which the curtains at their opposite ends are connected, and means for connecting the edge portions of the curtains to open and close the same.

7. In a luggage carrier, a lower frame, an upper frame, extensible devices connecting the upper frame with the lower frame, sets of spring rollers mounted in the lower frame, curtains connected at one end in the said upper frame and at the opposite end in the said rollers, and slidable closure devices for connecting the edges of the said curtains when extended.

8. In a luggage carrier, a fixed lower frame, an upper frame, sets of lazy tongs connecting the upper frame and the lower frame, stay bars to which each set of lazy tongs is pivotally connected, guide members fixed in position in the lower frame and slidably engaging the respective ends of the stay bars, off-set portions positioned on the outer ends of the stay bars and cooperating with the end surface of the guides to prevent longitudinal movement of the lazy tongs, and means for locking the upper frame and the sets of lazy tongs in an extended position.

FERDINAND G. HEUMANN.